(12) United States Patent
Nakamura et al.

(10) Patent No.: US 8,297,615 B2
(45) Date of Patent: Oct. 30, 2012

(54) SHEET PROCESSING APPARATUS AND CART

(75) Inventors: Tsuyoshi Nakamura, Ebina (JP); Ryuuichi Shiraishi, Ebina (JP); Toshio Kawachidani, Ebina (JP); Yoshimasa Sasaoka, Ebina (JP); Munetake Nagata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 371 days.

(21) Appl. No.: 12/361,952

(22) Filed: Jan. 29, 2009

(65) Prior Publication Data

US 2010/0078878 A1    Apr. 1, 2010

(30) Foreign Application Priority Data

Sep. 26, 2008   (JP) ................................ 2008-247467

(51) Int. Cl.
*B65H 31/04* (2006.01)

(52) U.S. Cl. ........ 271/214; 271/218; 271/207; 271/213; 414/789.7; 414/792.8; 414/789.9

(58) Field of Classification Search ................ 271/207, 271/213, 214, 217, 219; 414/396, 399, 401, 414/402, 790, 790.1, 789.9, 792.7, 789.7, 414/389
See application file for complete search history.

(56) References Cited

U.S. PATENT DOCUMENTS

| | | | | |
|---|---|---|---|---|
| 3,739,924 A * | 6/1973 | Stobb | ....................... | 414/789.9 |
| 3,883,131 A * | 5/1975 | Anderson et al. | ............. | 493/433 |
| 5,605,322 A * | 2/1997 | Suzuki et al. | ............... | 270/58.13 |
| 5,788,459 A * | 8/1998 | Neumann et al. | .......... | 414/789.9 |
| 6,099,452 A * | 8/2000 | Hoza et al. | .................... | 493/416 |
| 6,736,584 B2 * | 5/2004 | Dehn et al. | .................... | 414/396 |
| 7,374,168 B2 * | 5/2008 | Peeters et al. | ................. | 271/292 |
| 7,784,788 B2 * | 8/2010 | Fukatsu et al. | ................ | 271/292 |
| 7,793,932 B1 * | 9/2010 | Bartman | ...................... | 271/224 |
| 2006/0202412 A1 * | 9/2006 | Matsue et al. | ................ | 271/292 |

FOREIGN PATENT DOCUMENTS

| | | |
|---|---|---|
| JP | 3577894 B | 7/2004 |
| JP | 2006-76754 | 3/2006 |
| JP | 2006-240839 A | 9/2006 |
| JP | 2008-214010 A | 9/2008 |

* cited by examiner

*Primary Examiner* — Stefanos Karmis
*Assistant Examiner* — Ernesto Suarez
(74) *Attorney, Agent, or Firm* — Sughrue Mion, PLLC (57) ABSTRACT

The sheet processing apparatus is provided with: an apparatus main body that performs processing for a sheet; a sheet stacker on which a sheet transported from the apparatus main body is stacked in a first state where the sheet stacker is inclined with respect to a horizontal plane, and that is downwardly movable; and a moving-down unit that moves the sheet stacker down. The sheet stacker is provided so as to be detachable from the apparatus main body, and so as to change posture from the first state to a second state where the sheet stacker is less inclined relative to the first state.

8 Claims, 8 Drawing Sheets

SHEET PROCESSING APPARATUS AND CART

CROSS REFERENCE TO RELATED APPLICATIONS

This application is based on and claims priority under 35 USC §119 from Japanese Patent Application No. 2008-247467 filed Sep. 26, 2008.

BACKGROUND

1. Technical Field

The present invention relates to a sheet processing apparatus that performs processing for a sheet and a cart.

2. Related Art

There has been proposed a finishing apparatus of the image forming apparatus in which a finishing mechanism such as a sheet binding mechanism is built in a tray.

SUMMARY

According to an aspect of the invention, there is provided a sheet processing apparatus including: an apparatus main body that performs processing for a sheet; a sheet stacker on which a sheet transported from the apparatus main body is stacked in a first state where the sheet stacker is inclined with respect to a horizontal plane, and that is downwardly movable; and a moving-down unit that moves the sheet stacker down. The sheet stacker is provided so as to be detachable from the apparatus main body, and so as to change posture from the first state to a second state where the sheet stacker is less inclined relative to the first state.

BRIEF DESCRIPTION OF THE DRAWINGS

Exemplary embodiment(s) of the present invention will be described in detail based on the following figures, wherein:

FIGS. 6A to 7B are views for showing action of the movable member and the sheet stacking board.

DETAILED DESCRIPTION

[First Exemplary Embodiment]

Hereinafter, the first exemplary embodiments of the present invention will be described in detail with reference to the attached drawings.

Figure 1:
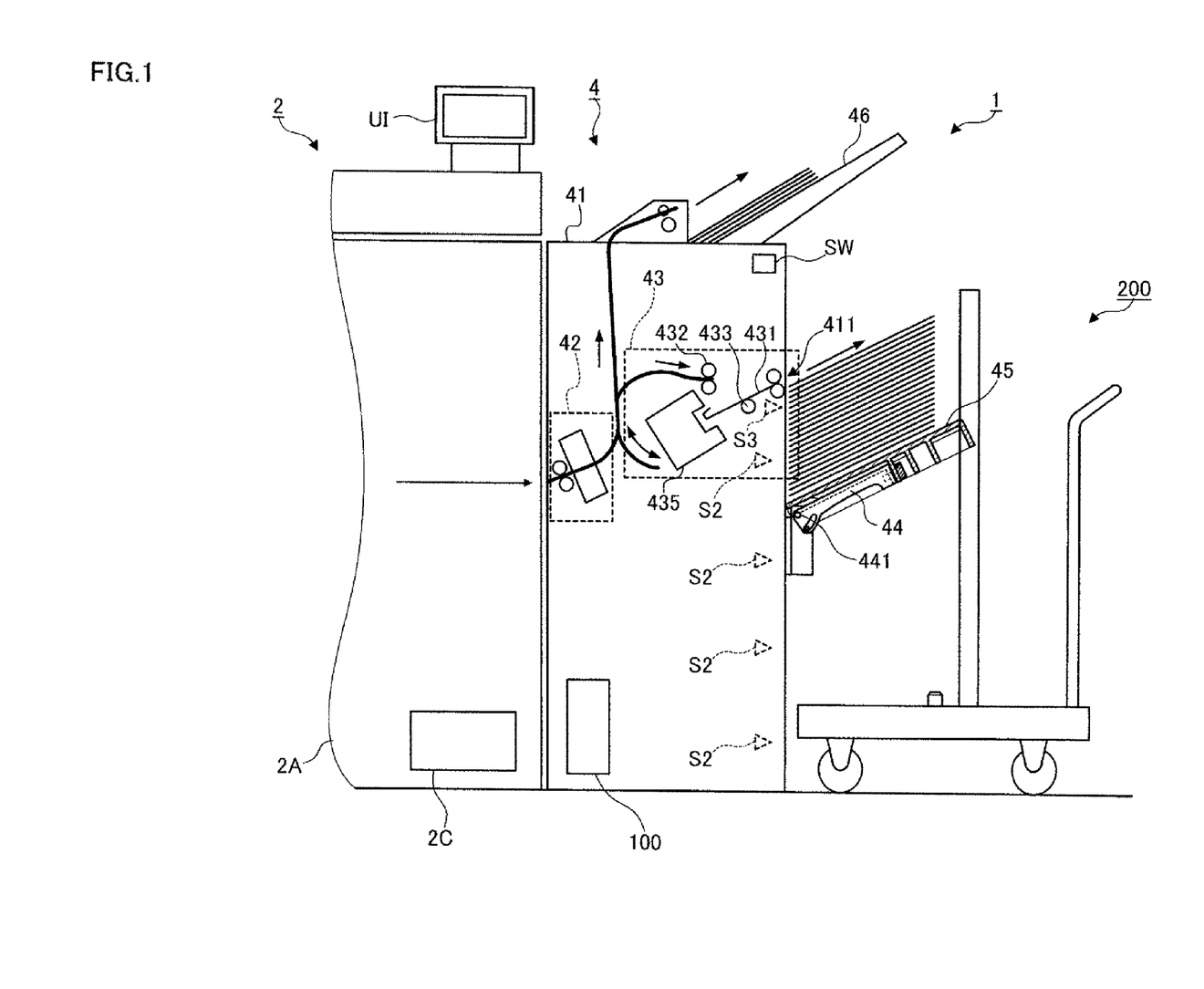
FIG. 1 is a view showing an entire configuration of a sheet processing system to which the first exemplary embodiment is applied.

FIG. 1 is a view showing an entire configuration of a sheet processing system 1 to which the first exemplary embodiment is applied.

The sheet processing system 1 shown in FIG. 1 includes an image forming apparatus 2 such as a printer or a copy machine that forms a color image with, for example, an electrophotographic method, and a sheet processing apparatus 4 that performs an finishing processing for a sheet on which a toner image is formed by the image forming apparatus 2, for example.

The image forming apparatus 2 includes an image forming apparatus main body 2A, and a user interface (UI) that is composed of a liquid crystal display, for example, and that receives an instruction (input) from a user while displaying information for the user thereon. Inside the image forming apparatus main body 2A, an image forming unit (not shown in the figure) that forms, for example, a toner image on the sheet is provided. Further, the image forming apparatus 2 includes a drive source such as a motor, and a sheet transporting mechanism (not shown in the figure) that transports (outputs) the sheet on which an image is formed by the image forming unit toward the sheet processing apparatus 4, while transporting another sheet toward the image forming unit. Furthermore, the image forming apparatus 2 includes a controller 2C that controls the above-described image forming unit and sheet transporting mechanism of the image forming unit main body 2A, the UI and the like.

Meanwhile, the sheet processing apparatus 4 includes an apparatus main body 41 that has four sides approximately perpendicular and that is formed into substantially a rectangular solid, a punching unit 42 that punches a sheet, and an edge binding unit 43 that binds an edge of a bundle of sheets with a staple. Further, the sheet processing apparatus 4 includes a controller 100 that is communicable with the controller 2C of the image forming apparatus 2 and that controls the sheet processing apparatus 4 entirely. Furthermore, the sheet processing apparatus 4 includes a movable member 44 that protrudes from one side of the apparatus main body 41 and that is movable on a moving path along an up and down direction. Here, the movable member 44 is provided so as to rotate (swing) around a shaft 441 attached to one end side of the movable member 44, and is arranged in an inclined state so that a side away from the apparatus main body 41 is located above a side closer to the apparatus main body 41.

Moreover, the sheet processing apparatus 4 includes a sheet stacking board 45 that is placed on the movable member 44. Here, the sheet stacking board 45 as an example of a sheet stacker is detachable from the movable member 44, and formed into a plate. In addition, on the sheet stacking board 45, a bundle of sheets that has been bound at the edge portion thereof by the edge binding unit 43 is stacked. The sheet stacking board 45 is provided in an inclined state (a first state) with respect to a horizontal plane, since the sheet stacking board 45 is placed on the inclined movable member 44. More specifically, the sheet stacking board 45 has one end closer to the apparatus main body 41 and the other end away from the apparatus main body 41, and the other end is located above the one end. In addition, since the movable member 44 is rotatably provided, the sheet stacking board 45 rotates around a portion where the shaft 441 is provided. To be more precise, the sheet stacking board 45 rotates around the one end thereof.

Besides, the sheet processing apparatus 4 includes an upper stacking unit 46 that is provided at an upper portion of the apparatus main body 41, and on which a sheet not processed by the sheet processing apparatus 4 or a sheet only punched by the punching unit 42 is stacked. Moreover, the sheet processing apparatus 4 includes a moving mechanism that moves the movable member 44 along the above-described moving path, and a fixing mechanism that fixes the movable member 44 to a sliding member (described later) included in the moving mechanism (which will be described later).

Note that, in the first exemplary embodiment, under the movable member 44, space is formed. Moreover, in the sheet processing apparatus 4 according to the first exemplary embodiment, at the space, a cart 200 used for transporting sheets is placeable.

Additionally, the sheet processing apparatus 4 includes a presence detecting sensor (not shown in the figure) that detects presence or absence of a sheet on the sheet stacking board 45, position detecting sensors S2 that detect a position of the movable member 44 in an up and down direction, and a sheet detecting sensor S3 that detects a sheet stacked on the sheet stacking board 45. Further, the sheet processing apparatus 4 includes a switch SW that receives an operation from a user at the time of moving the movable member 44 down (which will be described later in detail).

Note that, in the first exemplary embodiment, on the basis of output from the sheet detecting sensor S3, the controller 100 controls a position of the movable member 44. More specifically, the position control of the movable member 44 is performed such that an uppermost sheet stacked on the sheet stacking board 45 is placed lower than an output port 411 from which a bundle of sheets formed by the apparatus main body 41 and bound at the edge thereof is outputted. Further, in the first exemplary embodiment, on the basis of output from the sheet detecting sensor S3, the control 100 controls the position of the movable member 44 in order to maintain a fixed position of the uppermost sheet stacked on the sheet stacking board 45. By this control, as bundles of sheets are stacked on the sheet stacking board 45, the movable member 44 and the sheet stacking board 45 move down.

The edge binding unit 43 includes a compile portion 431 that collects and contains plural sheets, and exit rolls 432 as a pair of rollers that output a sheet toward the compile portion 431. Further, the edge binding unit 43 includes a main paddle and a sub paddle (which are not shown in the figure) that rotate for pushing a rear end of a sheet toward an end guide of the compile portion 431. Furthermore, the edge binding unit 43 includes an eject roll 433 that transports a bundle of sheets stacked on the compile portion 431 toward the sheet stacking board 45 through the output port 411. Still furthermore, the edge binding unit 43 includes an edge binding stapler 435 for binding an edge of the bundle of sheets contained in the compile portion 431.

Figure 2:
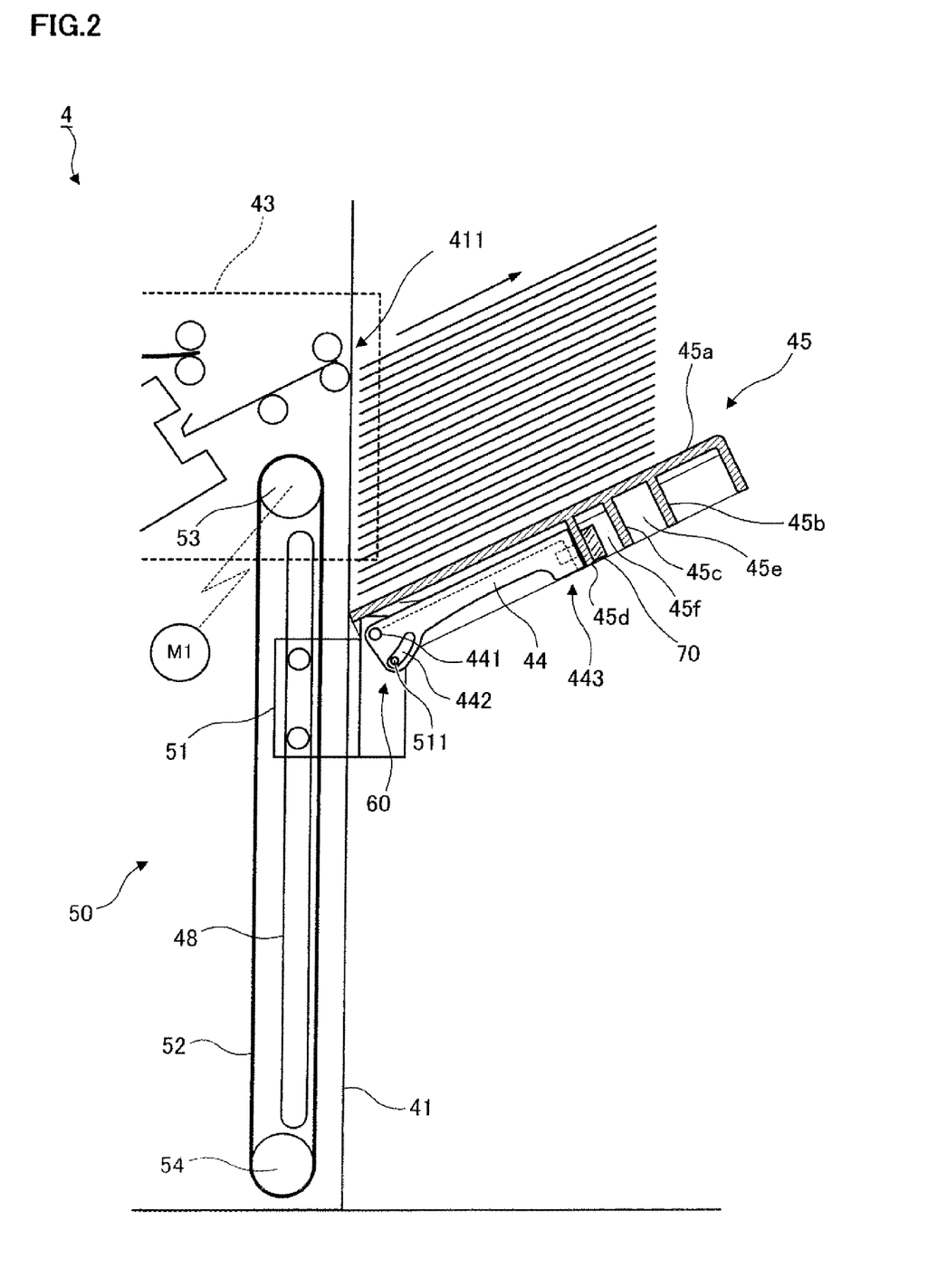
FIG. 2 is a view showing the moving mechanism that moves the movable member up and down, and the fixing mechanism that fixes the movable member and the sheet stacking board.

FIG. 2 is a view showing the moving mechanism that moves the movable member 44 up and down, and the fixing mechanism that fixes the movable member 44 and the sheet stacking board 45. Note that, in this figure, an illustration of the position detecting sensors S2 and the sheet detecting sensor S3 is omitted.

As shown in FIG. 2, the sheet processing apparatus 4 includes a moving mechanism 50 that moves the movable member 44 up and down, and a fixing mechanism 60 that fixes the movable member 44 and the sheet stacking board 45 that are rotatably provided.

The moving mechanism 50 functioning as an example of a moving-down unit includes a sliding member 51 to which the movable member 44 is attached via a shaft 441 attached to the one side of the movable member 44, and that slides upward or downward while being guided by a guide 48 formed in the apparatus main body 41. In this configuration, to the sliding member 51, the movable member 44 is attached via the shaft 441, as described above, and the movable member 44 rotates around the shaft 441 with respect to the sliding member 51.

Besides, the moving mechanism 50 includes a belt member 52 that is formed as an endless belt, and a first pulley 53 and a second pulley 54 that are arranged at intervals in an up and down direction, and that apply tension to the belt member 52 while supporting the belt member 52 from the inside thereof. Moreover, the moving mechanism 50 includes a motor M1 that drives the belt member 52 through the first pulley 53. In this configuration, the sliding member 51 is fixed to the belt member 52, and moves in the up and down direction in conjunction with the movement of the belt member 52.

In the first exemplary embodiment, for example, when the motor M1 is driven to rotate in a normal direction, the sliding member 51 slides downward according to the movement of the belt member 52. As a result, the movable member 44 moves downward. On the other hand, when the motor M1 is driven to rotate in an opposite direction, the sliding member 51 slides upward according to the movement of the belt member 52. As a result, the movable member 44 moves upward.

Next, a description will be given of the fixing mechanism 60.

The fixing mechanism 60 is composed of a long hole portion 442 formed in the movable member 44, a protruding pin 511 that protrudes from the sliding member 51 and that is arranged so as to penetrate the long hole portion 442, and a fixing member (not shown in the figure) that is fixed to the protruding pin 511 by using a screw, for example. Here, the long hole portion 442 is formed into an arc along a virtual circle whose center is located at the shaft 441. Thereby, when the movable member 44 rotates around the shaft 441, the protruding pin 511 moves in the long hole portion 442.

When the sheet is being stacked on the sheet stacking board 45, the movable member 44 is kept in an inclined state, as shown in FIG. 2. More specifically, the fixing member (not shown in the figure) is fixed to the protruding pin 511, and thus the movable member 44 is sandwiched between the sliding member 51 and the fixing member. Therefore, the movable member 44 is fixed to the sliding member 51 in the inclined state. The sheet stacking board 45 is also fixed in the inclined state. In contrast, when the fixing member is loosened or removed from the protruding pin 511 so as to release the movable member 44, the movable member 44 rotates in a clockwise direction in FIG. 2, by its own weight and the like. According to this movement, together with the movable member 44, the sheet stacking board 45 also rotates in the clockwise direction in FIG. 2.

Note that, the sheet stacking board 45 includes a base board 45a on which a sheet is stacked, and a first protruding board 45b, a second protruding board 45c and a third protruding board 45d that are arranged so as to be orthogonal to the base board 45a and that protrude downward from the base board 45a. Between the first protruding board 45b and the second protruding board 45c, a first concave portion 45e is provided, and between the second protruding board 45c and the third protruding board 45d, a second concave portion 45f is provided.

On the other hand, the movable member 44 includes a screw attachment portion 443 for attaching a screw 70, at an end portion opposite to the other end portion at which the shaft 441 is provided. In the first exemplary embodiment, the screw 70 is arranged so as to penetrate a penetration hole portion (not shown in the figure) formed in the third protruding board 45d. Thus, the screw 70 is fixed to the screw attachment portion 443. By this configuration, while being fixed to the movable member 44, the sheet stacking board 45 is detachable from the movable member 44 by loosening the screw 70.

Further, a description will be given of the sheet stacking board 45 and the cart 200.

Figure 3A:
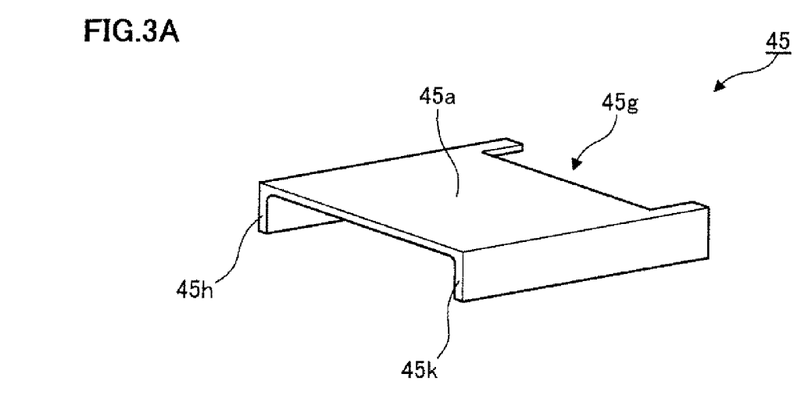
FIGS. 3A and 3B are perspective views showing the sheet stacking board and the cart.
Figure 3B:
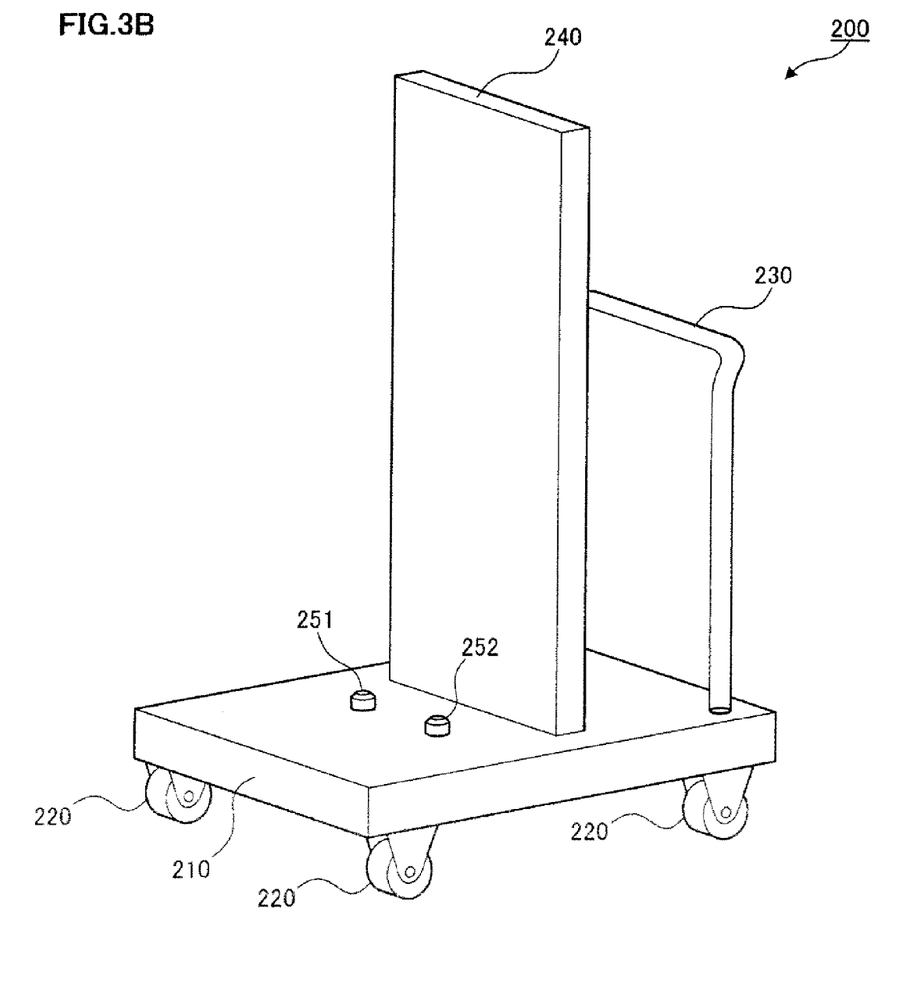

FIGS. 3A and 3B are perspective views showing the sheet stacking board 45 and the cart 200.

As shown in FIG. 3A, the sheet stacking board 45 includes a cut-out 45g at one end portion of the base board 45a. As a result, the one end portion of the base board 45a of the sheet stacking board 45 is formed into substantially a U shape. The sheet stacking board 45 includes a fifth protruding board 45k and a sixth protruding board 45h that are arranged on and along a side portion of the base board 45a and that protrude downward.

On the other hand, as shown in FIG. 3B, the cart 200 includes a base board 210 functioning as a supporting portion that is formed into a rectangle and that supports the sheet stacking board 45, wheels 220 that are attached to respective four corners of the bottom surface of the base board 210, and a handle 230 that is attached to one side of the top surface of the base board 210. Further, the cart 200 includes a protruding board 240 that is attached to a side where the handle 230 is provided, that is arranged along the one side of the base board 210, and that upwardly protrudes from the top surface of the base board 210. Here, the protruding board 240 is arranged so as to be orthogonal to the base board 210. Thus, when the base board 210 is horizontally arranged, the protruding board 240 is arranged along the vertical direction. Furthermore, the cart 200 includes a first protruding portion 251 and a second protruding portion 252 that are arranged along an arrangement direction of the protruding board 240 side by side, and that upwardly protrude from the top surface of the base board 210.

In the first exemplary embodiment, when the sheet stacking board 45 is placed on a position of the base board 210, which is set in advance, the first protruding portion 251 and the second protruding portion 252 are fitted into the first concave portion 45e (refer to FIG. 2) formed in the sheet stacking board 45. This configuration regulates the movement of the sheet stacking board 45 in a direction away from the protruding board 240. In addition, in the first exemplary embodiment, when the sheet stacking board 45 is placed on the portion of the base board 210, which is set in advance, the protruding board 240 is fitted into the cut-out 45g. This configuration regulates the movement of the sheet stacking board 45 in a direction along the protruding board 240. Thus, when the sheet stacking board 45 is placed on the position of the base board 210, which is set in advance, displacement of the sheet stacking board 45 is restricted with respect to the base board 210. In this configuration, the first concave portion 45e, the cut-out 45g may be taken as a regulation portion that regulates the movement of the sheet stacking board 45 with respect to the cart 200 (or the base board 210). Also, the first protruding portion 251 and the second protruding portion 252 may be taken as a regulation portion that regulates the movement of the sheet stacking board 45 with respect to the cart 200 (or the base board 210).

Recently, quality of an image formed by the image forming apparatus 2 has been improved, so that it is comparable to print quality. In addition, if the bind processing or the like is outsourced, information leakage or the like may occur. Therefore, instead of outsourcing the print processing, cases of performing image formation on sheets by using the image forming apparatus 2 and an additional processing such as bind processing of the sheets carried to another apparatus in the company or the like has been increasing.

More specifically, for example, processing such as a so-called tape binding in which a tape is attached to an end portion of the sheet stacked on the sheet stacking board 45 may be performed by another processing apparatus in some cases. Note that, in the first exemplary embodiment, an example of stacking the sheets processed by the staple on the sheet stacking board 45 has been described. However, for example, when sheets without any processing are stacked on the sheet stacking board 45, the sheets may be subjected to another processing such as a bond processing at an end portion thereof using glue, a center bind processing and the like by the another processing apparatus, in some cases.

In such a case, if the another processing apparatus is installed far from the image forming apparatus 2, sheets should be carried to the another processing apparatus. In this case, in general, the sheets stacked on the sheet stacking board 45 should be manually moved onto the cart 200, which is troublesome. In order to avoid it, in the first exemplary embodiment, operation for moving the movable member 44 down and the like are performed, as described below. Note that, there is another method in which a sheet outputted from the sheet processing apparatus 4 is directly stacked on the cart 200, for example. However, in such a case, since the cart 200 is to be large so that a sheet having, for example, an A3 size or larger is stacked thereon, the apparatus is also large in size. At the same time, it increases the cost.

Figure 4:
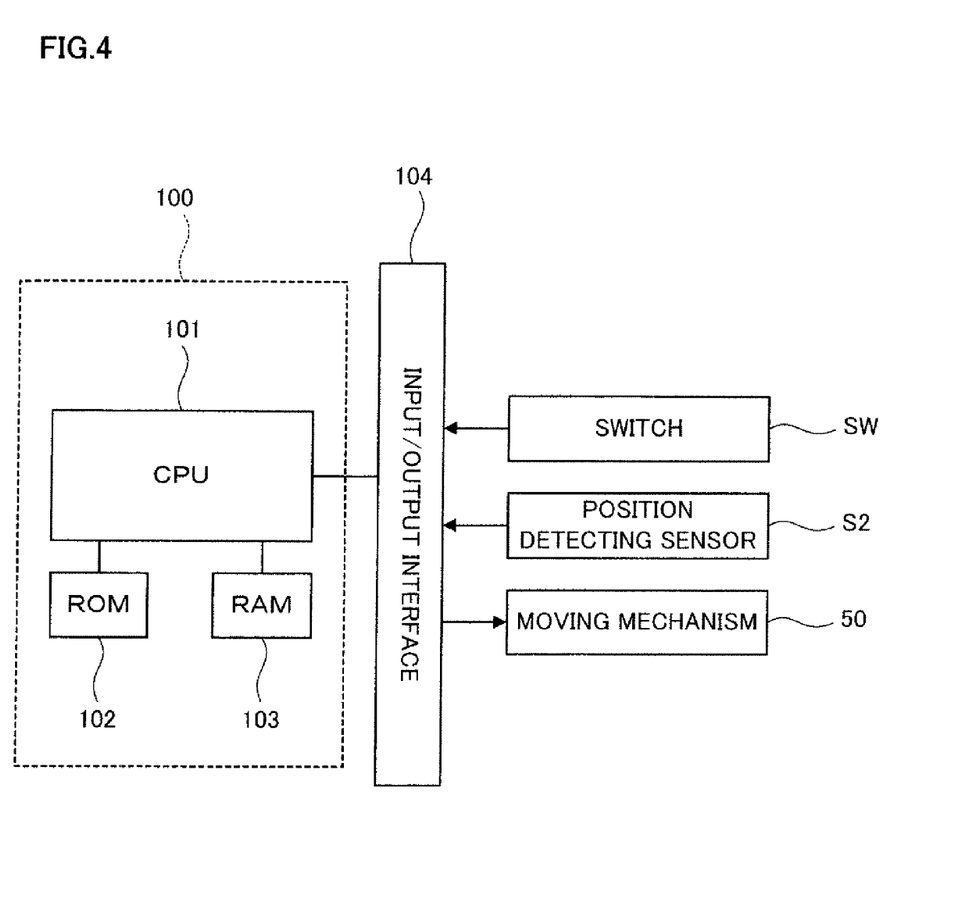
FIG. 4 is a diagram showing a control block of the controller.

FIG. 4 is a diagram showing a control block of the controller 100. Note that, in FIG. 4, blocks related to the control of the movable member 44 are shown.

The controller 100 includes a Central Processing Unit (CPU) 101, a Read Only Memory (ROM) 102, and a Random Access Memory (RAM) 103. The CPU 101 of the controller 100 executes processing, while performing data communication with the RAM 103, according to a program stored in the ROM 102.

Output from a switch SW and output from the position detecting sensors S2 are inputted to the controller 100 via an input/output interface 104. Further, the controller 100 controls the moving mechanism 50 (the motor M1, specifically) via the input/output interface 104.

Subsequently, a description will be given of processing of the controller 100, more specifically.

Figure 5:
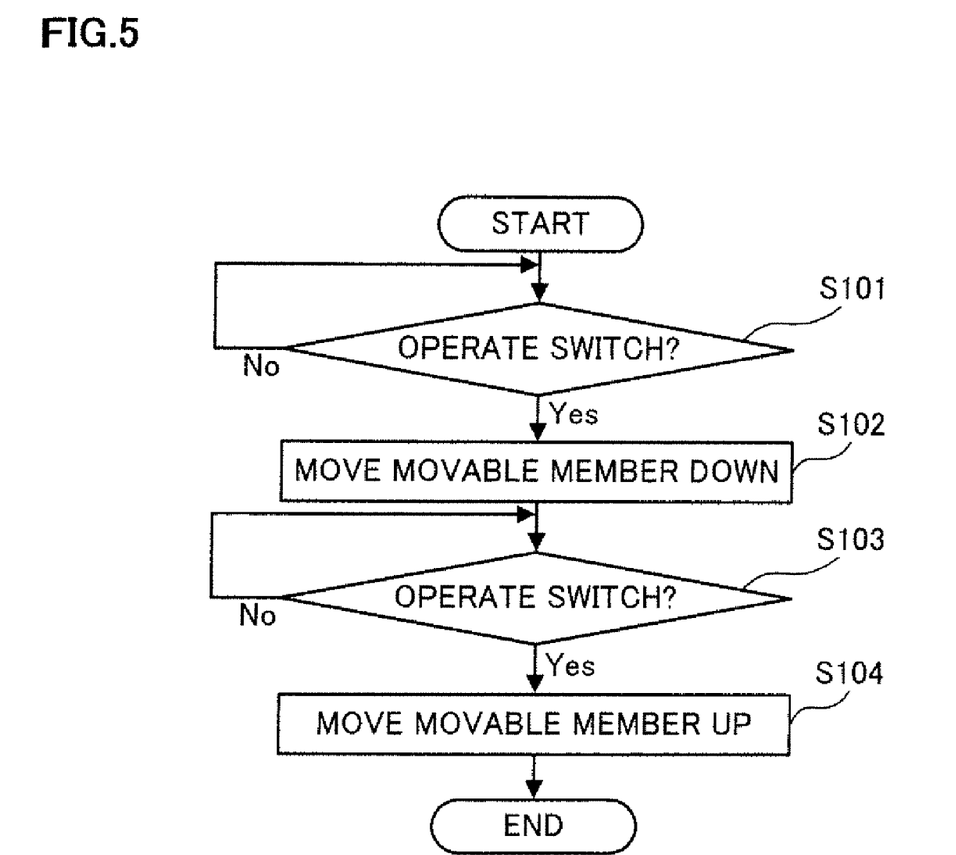
FIG. 5 is a flowchart showing an example of a processing procedure by the controller.

FIG. 5 is a flowchart showing an example of a processing procedure by the controller 100. FIGS. 6A to 7B are views for showing an action of the movable member 44 and the sheet stacking board 45.

Figure 6A:
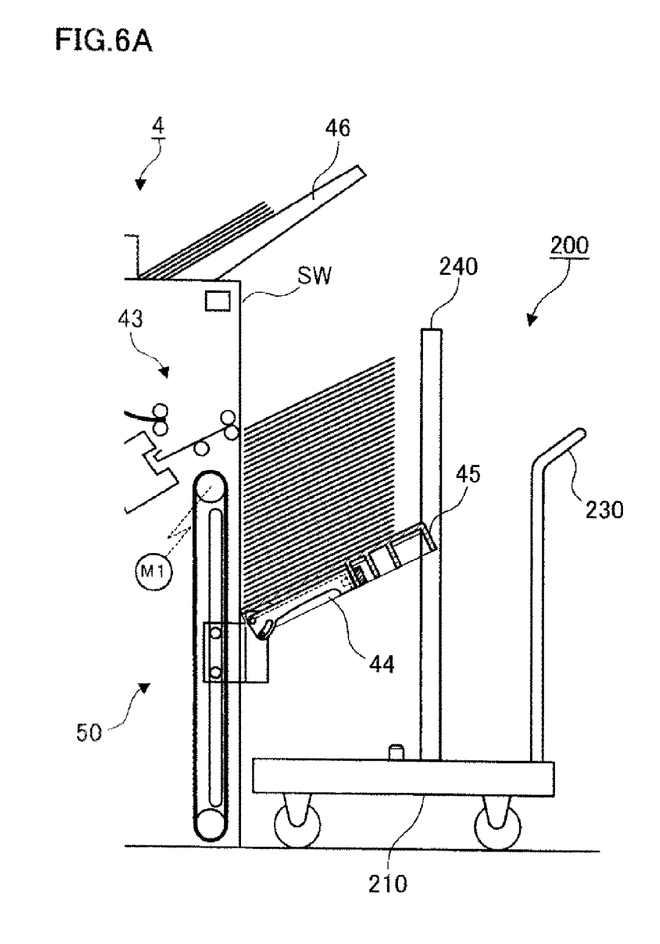
Figure 6B:
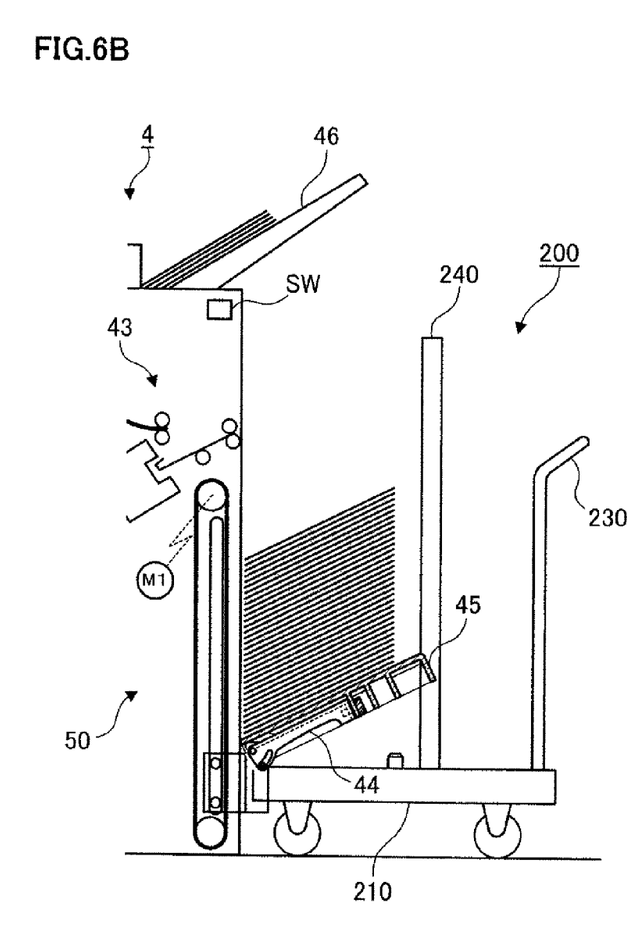

As shown in FIG. 5, the controller 100 determines whether a user operates the switch SW or not (step 101). When the controller 100 determines that the user does not operate the switch SW, the controller 100 waits an operation from a user. On the other hand, when the controller 100 determines that the user operates the switch SW, the controller 100 drives the motor M1 in the moving mechanism 50. Then, on the basis of the output from the position detecting sensors S2, the controller 100 causes the movable member 44 to move down to a position which is set in advance, and at which the sheet stacking board 45 is placeable on the cart 200 (step 102). As a result, as shown in FIGS. 6A and 6B, the sheet stacking board 45 on an upper position moves down to a position set in advance.

Figure 7A:
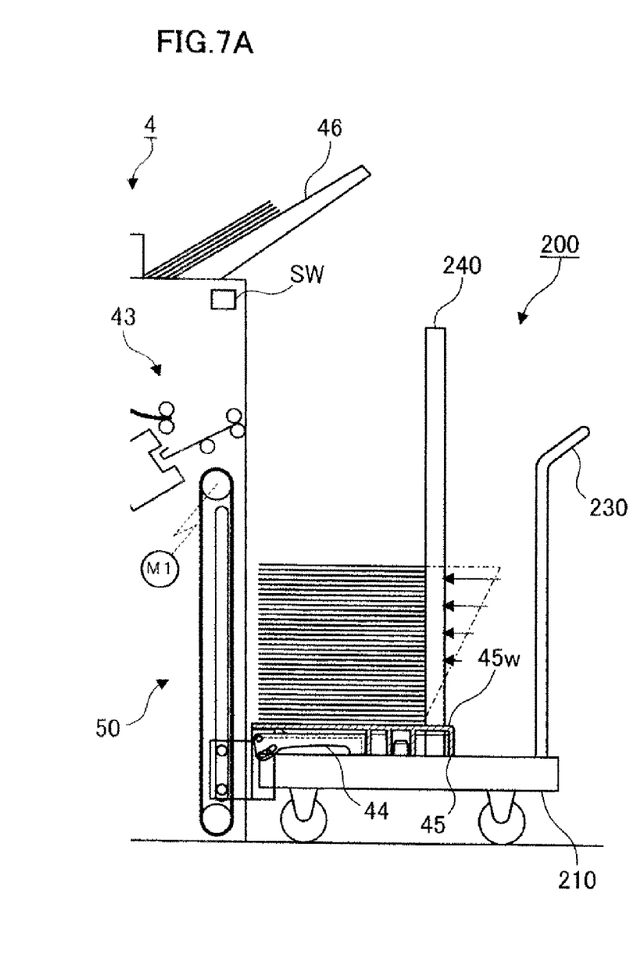

Thereafter, the movable member 44 fixed by the above-described fixing member (not shown in the figure) is released by user's operation. As a result, the movable member 44 rotates around the shaft 441 (refer to FIG. 2) by using its own weight, weight of the sheet stacking board 45, and weight of the sheets stacked on the sheet stacking board 45. According to the rotation of the movable member 44, the sheet stacking board 45 also rotates. Consequently, as shown in FIG. 7A, the sheet stacking board 45 changes a posture to an approximately horizontal state (an example of a second state), and is placed on the base board 210 of the cart 200. Here, when the sheet stacking board 45 is placed on the base board 210, the first protruding portion 251 and the second protruding portion 252 (refer to FIG. 3) are fitted into the first concave portion 45e (refer to FIG. 2) of the sheet stacking board 45. Further, the protruding board 240 is fitted into the cut-out 45g (refer to FIG. 3) of the sheet stacking board 45. Note that, fixing of the sheet stacking board 45 to the movable member 44 may be released by operating the screw 70 before the movable member 44 rotates, or after the movable member 44 rotates and the sheet stacking board 45 is placed on the base board 210.

Note that, when the sheet stacking board 45 rotates and becomes in a horizontal state, the sheets on the sheet stacking board 45 are usually stacked in a state toward an obliquely upward direction. More specifically, the sheets on the sheet stacking board 45 become in a state where the sheets protrude beyond an outer edge portion 45W (refer to FIG. 7A) of the sheet stacking board 45 in the horizontal direction (refer to broken lines in FIG. 7A). However, in the first exemplary embodiment, when the sheet stacking board 45 rotates and becomes in the horizontal state, the sheets on the sheet stacking board 45 are pushed by the protruding board 240 while becoming in contact with the protruding board 240 functioning as a contact portion, and thus the sheets move toward an internal direction of the outer edge portion 45W of the sheet stacking board 45 (the sheets moves inward).

Figure 7B:
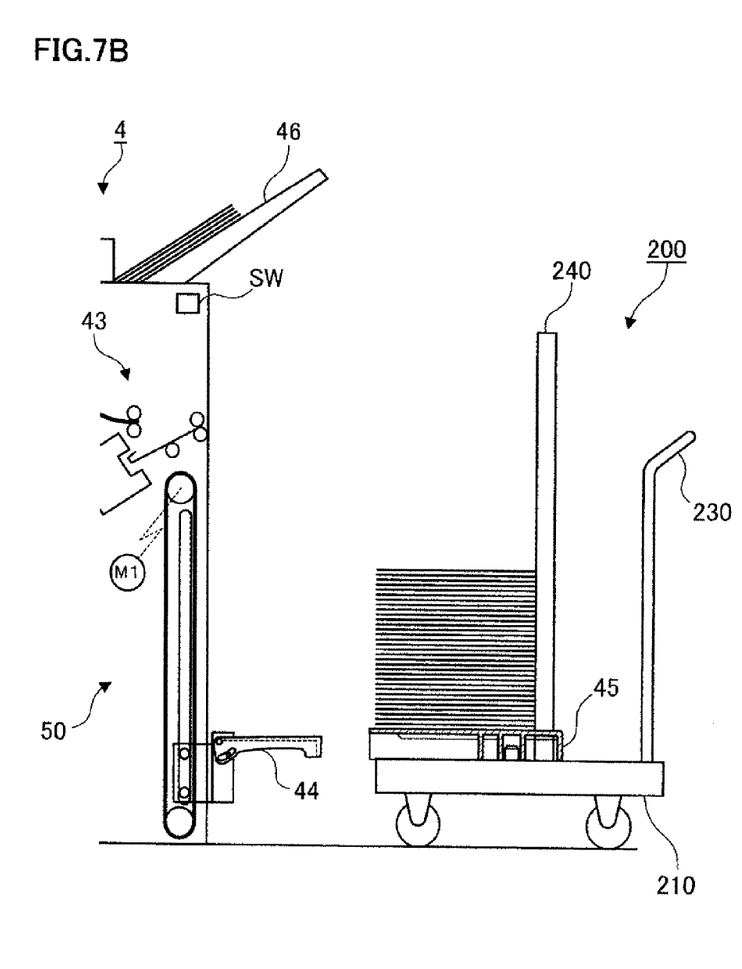

Then, in a state where the sheet stacking board 45 is placed on the cart 200, when the cart 200 is moved in a direction away from the sheet processing apparatus 4, the sheet stacking board 45 is moved together with the cart 200 since the sheet stacking board 45 and the base board 210 work as a unit (refer to FIG. 7B). More specifically, when the cart 200 is moved in the direction away from the apparatus main body 41, the sheet stacking board 45 is moved together with the cart 200 while sliding in the direction away from the apparatus main body 41 on the movable member 44. By this operation, the sheets processed by the sheet processing apparatus 4 are carried to the another processing apparatus.

Turning back to FIG. 5, a further description will be given. The controller 100 then determines whether the user operates the switch SW or not (step 103). Then, when the controller 100 determines that the user operates the switch SW, the controller 100 causes the motor M1 of the moving mechanism 50 to be driven, and causes the movable member 44 to be moved up to a position set in advance (step 104), and finishes the processing. Note that, the movable member 44 may be moved up in a state where the sheet stacking board 45 is placed on the movable member 44, or where the sheet stacking board 45 is not placed on the movable member 44. In addition, the movable member 44 may be moved up in a horizontal state as shown in FIG. 7B, or in an inclined state.

Note that, in the above-mentioned processing, a switch SW is provided in the sheet processing apparatus 4, and the user's operation is received by using the switch SW. However, the user's operation may be received by using the UI provided in the image forming apparatus 2. Further, in the first exemplary embodiment, although the controller 100 provided in the sheet processing apparatus 4 performs operation for moving the movable member 44 down and the like, such operation may be performed by the controller 2C in the image forming apparatus 2. Furthermore, in the first exemplary embodiment, the rotation of the movable member 44 is performed by the user's operation. However, if a drive mechanism having a drive source such as a motor is provided, the rotation of the movable member 44 may be performed by the drive mechanism.

The configuration of the cart 200 may differ from the above configuration, but the illustration thereof is omitted.

The installation of the sheet stacking board 45 to the cart 200 is performable if one of four sides of the base board 210 is open. Thus, in addition to the protruding board 240, two protruding boards that are arranged along respective two other sides of the base board 210 may be further provided. In this case, a drop of sheets from the cart 200 may be further prevented. Note that, in order to easily take cut the sheets from the cart 200, at least one of the three protruding boards may be formed openably like a door.

In the first exemplary embodiment, the sheet stacking board 45 is detachable from the movable member 44 of the sheet processing apparatus 4, but the movable member 44 and the sheet stacking board 45 may be provided in the image forming apparatus 2, for example. The sheet outputted from the image forming apparatus 2 may be placed on the cart 200 by using the movable member 44 and the sheet stacking board 45. That is, the above-mentioned configuration may be applied to the apparatus other than the sheet processing apparatus 4.

Further, in the first exemplary embodiment, the description has been given of the sheet stacking board 45 detachable from the sheet processing apparatus 4. However, even in a configuration where the sheet stacking board 45 is not detachable, the sheets may be easily moved onto the cart 200. For example, if the sheet stacking board 45 is moved down and rotated so that the upper surface of the sheet stacking board 45 and the upper surface of the base board 210 of the cart 200 are aligned with each other, the sheets stacked on the sheet stacking board 45 are slidable to the base board 210. In this case, the sheets are easily moved onto the cart 200 in comparison with the case where the sheet stacking board 45 is inclined.

Furthermore, in the cart 200 according to the first exemplary embodiment, the protruding board 240 and the handle 230 are separately provided, but the handle 230 may be attached to the protruding board 240. Alternatively, without the handle 230, the protruding board 240 may have a function as the handle 230 by forming an opening or the like. Moreover, the protruding board 240 according to the first exemplary embodiment is formed into a rectangular, and does not have an opening portion and a cut-out portion, but the protruding board 240 may have an opening portion and a cut-out portion. In this case, user's view during the operation of the cart 200 is better as compared to the case where the opening portion and the cut-out portion are not provided.

[Second Exemplary Embodiment]

Next, a description will be given of the second exemplary embodiment.

Figure 8A:
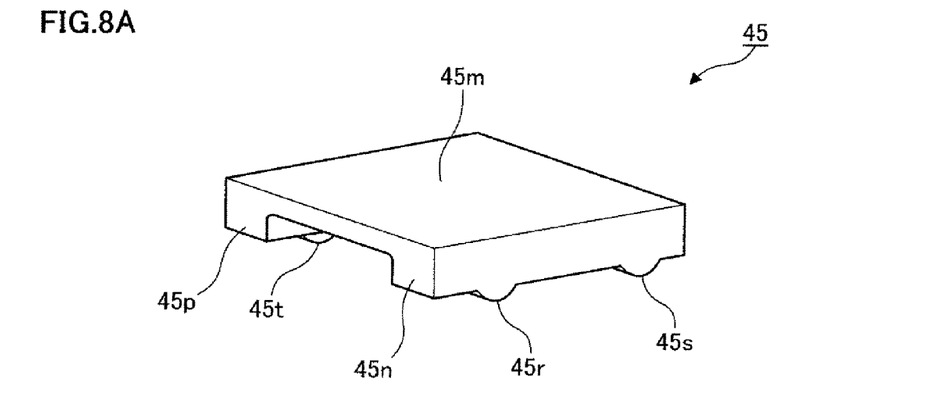
FIGS. 8A and 8B are perspective views showing a sheet stacking board and a cart according to the second exemplary embodiment.
Figure 8B:
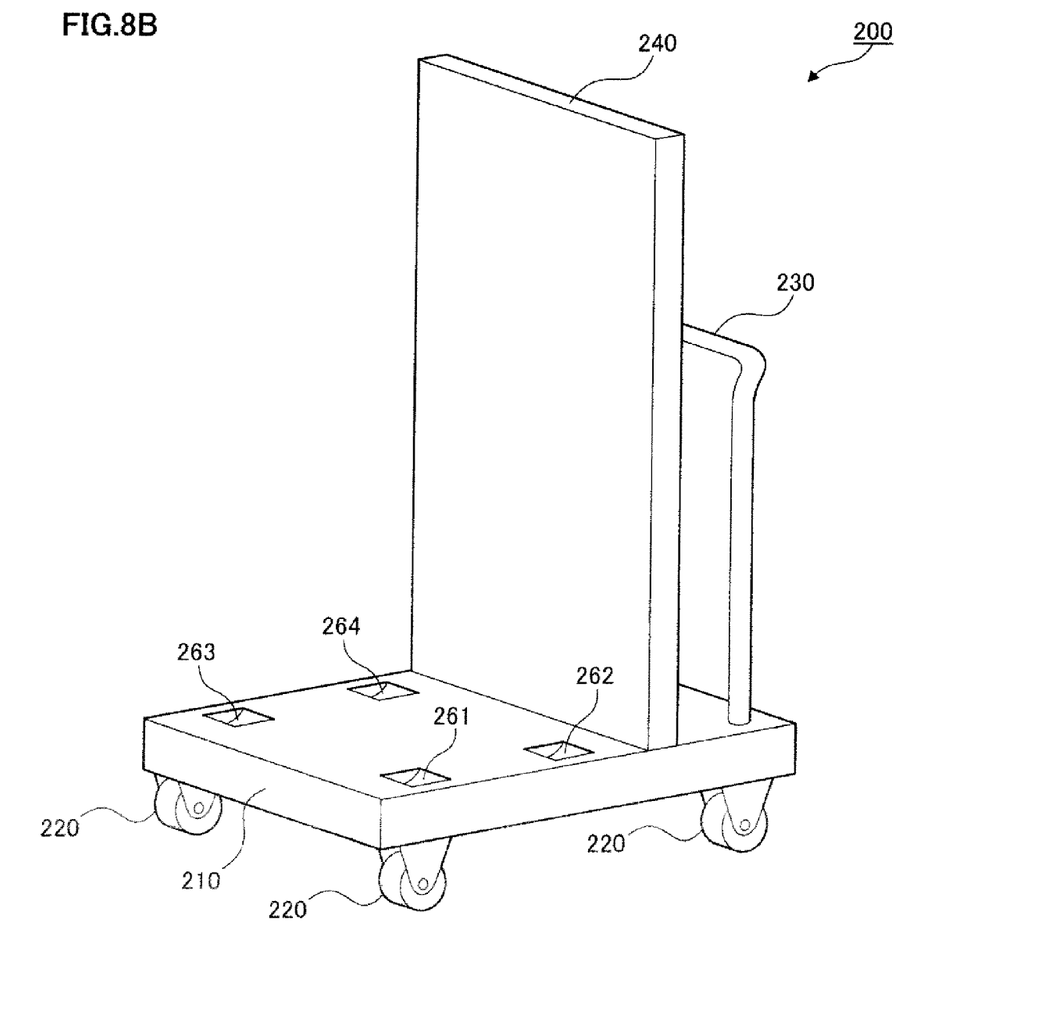

FIGS. 8A and 8B are perspective views showing a sheet stacking board 45 and a cart 200 according to the second exemplary embodiment. Note that, functions similar to those of the first exemplary embodiment are assigned the same reference numerals, and the description thereof is omitted here.

As shown in FIG. 8A, the sheet stacking board 45 is formed into a rectangular, and includes a base board 45m on which a sheet is stacked, and first and second protruding portions 45n and 45p that are provided along both side portions of the base board 45m, respectively, and that protrude from the base board 45m downwardly. Further, the sheet stacking board 45 includes third and fourth protruding portions 45r and 45s that further protrude from the first protruding portion 45n. Furthermore, to the second protruding portion 45p, a fifth protruding portion 45t and a sixth protruding portion (not shown in the figure) that further protrude from the second protruding portion 45p are provided.

On the other hand, as shown in FIG. 8B, the cart 200 includes concave portions 261 to 264 on the top surface of the base board 210 formed into a rectangular. The concave portions 261 to 264 are formed into a shape similarly to the third protruding portion 45r, the fourth protruding portion 45s, the fifth protruding portion 45t and the sixth protruding portion (not shown in the figure) provided in the sheet stacking board 45, and the concave portions 261 to 264 contain these protruding portions. When the third protruding portion 45r, the fourth protruding portion 45s, the fifth protruding portion 45t and the sixth protruding portion (not shown in the figure) are contained in the four concave portions 261 to 264, displacement of the sheet stacking board 45 is regulated with respect to the base board 210, since the sheet stacking board 45 is positioned with respect to the base board 210.

In the first exemplary embodiment, the protruding portions (the first protruding portion 251 and the second protruding portion 252 (refer to FIG. 3)) are provided to the base board 210, and the concave portion (the first concave portion 45e (refer to FIG. 2)) is provided to the sheet stacking board 45. On the contrary, as in the second exemplary embodiment, the concave portions may be provided to the base board 210, and the protruding portions may be provided to the sheet stacking board 45.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sheet processing apparatus comprising:
   an apparatus main body that performs processing for a sheet;
   a movable member having one end attached to the apparatus main body and another end on a side away from the apparatus main body, the movable member being rotatable around a predetermined portion of the one end and being capable of changing posture from a first state to a second state, the first state being a state where the movable member is inclined with respect to a horizontal plane, the second state being a state where the movable member is less inclined relative to the first state;
   a sheet stacker having one end on a side closer to the apparatus main body and the other end on a side away from the apparatus main body, and placed on the movable member while being supported by the movable member from below, the sheet stacker being detachable from the movable member and from the apparatus main body, wherein the sheet stacker stacks sheets transported from the apparatus main body while the movable member is in the first state, and wherein the movable member changes posture from the first state to the less inclined second state; and
   a moving-down unit that moves the movable member down, wherein a cart is placed below the sheet stacker to support the sheet stacker from below,
   the sheet stacker placed on the cart by moving the movable member, having been moved down by the moving-down unit, from the first state to the second state, and
   both the one end and the other end of the sheet stacker are placed on the cart when the sheet stacker is placed on the cart by changing posture of the movable member from the first state to the second state.

2. The sheet processing apparatus according to claim 1, wherein the sheet stacker is provided so as to change posture at least to a horizontal state from the first state.

3. The sheet processing apparatus according to claim 1, wherein the sheet stacker is provided so as to be detachable from the apparatus main body, and so as to be slidable in a direction away from the apparatus main body.

4. The sheet processing apparatus according to claim 1, wherein the sheet stacker changes posture to the second state by using weight of its own and weight of the sheet stacked on the sheet stacker.

5. The sheet processing apparatus according to claim 4, further comprising:
   the cart including:
      a supporting portion on which the sheet stacker stacking a sheet is to be placed while the sheet stacker changes posture from the first state to the second state, the first state indicating that the sheet stacker is inclined with respect to the horizontal plane, the second state indicating that the sheet stacker is less inclined relative to the first state; and
      a contact portion moving the sheet inwardly when the sheet stacker changes posture from the first state to the second state, wherein
   the cart is provided so as to be detachable from the apparatus main body, and so as to be slidable in a direction away from the apparatus main body.

6. The sheet processing apparatus according to claim 4, wherein the sheet stacker having changed posture to the second state is placed on the cart, the cart including a supporting portion on which the sheet stacker is to be placed, and a contact portion that comes in contact with the sheet on the sheet stacker and moves the sheet inside of an outer edge of the sheet stacker when the sheet protrudes outside of the outer edge of the sheet stacker.

7. The sheet processing apparatus according to claim 6, wherein the supporting portion of the cart includes a regulation portion that regulates movement of the sheet stacker with respect to the supporting portion.

8. The sheet processing apparatus according to claim 1, wherein, when the movable member changes posture from the first state to the second state, and the sheet on the sheet stacker protrudes outside of an outer edge of the sheet stacker, the protruding sheet comes in contact with a portion of the cart so that the sheet is moved inside of the outer edge of the sheet stacker.

* * * * *